United States Patent [19]

Maehara

[11] 4,455,831
[45] Jun. 26, 1984

[54] DIFFERENTIAL MASTER CYLINDER

[75] Inventor: Toshifumi Maehara, Saitama, Japan

[73] Assignee: Akebono Brake Industry Co., Ltd., Tokyo, Japan

[21] Appl. No.: 364,183

[22] Filed: Mar. 31, 1982

[30] Foreign Application Priority Data

Apr. 14, 1981 [JP] Japan .................................. 56-56147

[51] Int. Cl.³ .......................... B60T 11/08; F15B 7/04
[52] U.S. Cl. ....................................... 60/574; 60/578; 60/585; 60/589; 60/562
[58] Field of Search ................. 60/574, 576, 578, 585, 60/589, 562, 555, 558, 547.2, 548

[56] References Cited

U.S. PATENT DOCUMENTS

| 1,958,722 | 5/1934 | Sinclair et al. | 60/576 |
| 2,508,403 | 5/1950 | Knauss | 60/576 |
| 2,631,433 | 3/1953 | Thomas | 60/555 |
| 2,661,598 | 12/1953 | Thomas | 60/558 |
| 2,976,686 | 3/1961 | Stelzer | 60/555 |
| 4,078,385 | 3/1978 | Zabadneh | 60/574 |
| 4,140,351 | 2/1979 | Nogami | 60/558 |

FOREIGN PATENT DOCUMENTS 606520 10/1960 Canada .................................. 60/555

Primary Examiner—Robert E. Garrett
Assistant Examiner—Scott L. Moritz
Attorney, Agent, or Firm—Toren, McGeady and Stanger

[57] ABSTRACT

A differential master cylinder adapted for use as fluid pressure generating source in a brake system comprises a cylinder body having a stepped cylinder formed therein; a stepped piston arranged to be slidable within the stepped cylinder; a first chamber defined by the end of a portion of smaller diameter of the stepped piston and a portion of smaller diameter of the stepped cylinder; a second chamber defined by the stepped piston and a portion of larger diameter of the stepped cylinder; a first fluid passage provided at the stepped piston and arranged to have the first and second chambers intercommunicate; a check valve arranged in the first fluid passage to close when fluid pressure within the second chamber reaches a first setting value; and a relief valve arranged to open to return the fluid from the second chamber to a reservoir when the fluid pressure within the second chamber reaches a second setting value which is higher than the first value. The relief valve is disposed in a second fluid passage formed within the cylinder body to render the second chamber communicative with the reservoir. The master cylinder arrangement gives a sufficient force multiplying effect despite of simple construction thereof and ensures stable operation even for sudden brake application.

6 Claims, 2 Drawing Figures

DIFFERENTIAL MASTER CYLINDER

BACKGROUND OF THE INVENTION

1. Field of the Invention

This invention relates to a differential master cylinder adapted for use as fluid pressure generating source in a brake system.

2. Description of the Prior Art

Popularization of use of disc brakes for motor vehicles has necessitated use of a fluid pressure cylinder arrangement of relatively large piston diameter in general for obtaining a large braking force by pressing friction pads against a rotor. This necessity causes an increase in the quantity of brake fluid required to be transferred in the initial stage of a braking operation for covering a gap existing between each friction pad and the rotor before the pad comes to abut upon the rotor. Accordingly, a master cylinder which generates braking fluid pressure is generally arranged to be of large diameter. Besides, to obtain high braking fluid pressure from the use of a master cylinder of large diameter, there is provided a force multiplying device for a pedalling force in combination with a brake pedal in most cases.

Further, to prevent any energy loss by preventing the dragging of the friction pads by the rotor during a non-brake applying condition in accordance with a recent tendency of energy saving, it is necessary to retain a required extent of gap between the rotor and the friction pad. This, therefore, also calls for use of a master cylinder of still larger diameter and a larger force multiplying device.

Meanwhile, there have been various efforts to obviate the disadvantage of increased weight, etc. resulting from the above stated tendency of increasing the size of a brake system. As a result of such efforts, there have been provided arrangements called differential master cylinders. Each of these differential master cylinders is provided with larger and smaller cylinder portions of different diameters. These larger and smaller cylinder portions are arranged to perform two functions separately from each other. One is to transfer a large quantity of the fluid at the initial stage of brake application while almost no fluid pressure is required. The other is to produce a high degree of fluid pressure required for obtaining a large pressing force after the friction pads have abutted on the rotor.

Generally, such conventional differential master cylinders are of the type wherein a fluid passage provided for the purpose of replenishing the smaller cylinder portion with the fluid from the larger cylinder portion is merely arranged to be opened and closed by means of a piston which slidably engages the larger cylinder portion and the smaller cylinder portion. However, since the fluid passage is of a relatively narrow structure, the conventional differential master cylinders have a shortcoming in respect to the stability of their operations at the time of quick or sudden application of pressure (or sudden brake application). Further, since a mechanism for opening and closing the fluid passage is arranged within the piston, the arrangement complicates the construction of the conventional differential master cylinder. Therefore, it has been hardly possible to obtain a sufficiently great force multiplying effect.

SUMMARY OF THE INVENTION

This invention is directed to the elimination of the shortcomings of the conventional differential master cylinders. It is therefore a general object of the invention to provide a differential master cylinder in which the replenishment of fluid from a larger cylinder portion to a smaller cylinder portion at the initial stage of brake application is accomplished with a simple structural arrangement; a sufficiently large pressing force can be obtained after abutting of friction pads on a rotor; and a stable operation can be performed even at the time of sudden application of pressure.

The above and further objects and features of the invention will become apparent from the following detailed description of preferred embodiments thereof taken in conjunction with the accompanying drawings.

DETAILED DESCRIPTION OF PREFERRED EMBODIMENTS

Example 1

Figure 1:
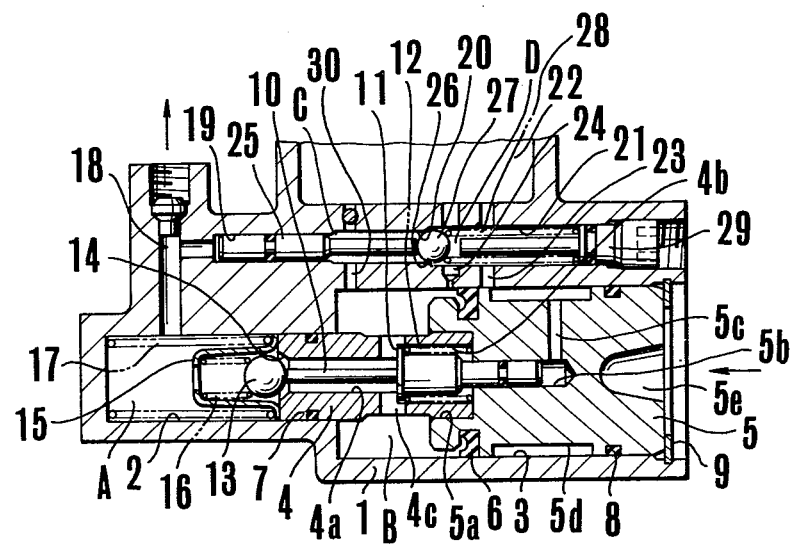
FIG. 1 is a longitudinal sectional view showing a differential master cylinder as a first embodiment example of the present invention.

A first embodiment example which is shown in FIG. 1 comprises a cylinder body 1 and a stepped cylinder arrangement consisting of cylinders 2 and 3 of larger and smaller diameters. The cylinder 2 which is of the smaller diameter has a piston 4 of smaller diameter slidably engaged therewith. The cylinder 3 which is of the larger diameter has a piston 5 of larger diameter slidably engaged therewith. The right end of the smaller piston 4 is secured to the inside of a recess 5a which is situated at the front end of the larger piston 5. The smaller piston 4 is provided with a stepped passage arrangement consisting of fluid passages 4a and 4b piercing through the small piston 4 in the axial direction thereof and leading to both ends thereof. Meanwhile, the small piston 4 is further provided with another fluid passage 4c which extends in a diametric direction of the small piston from the piercing fluid passages 4a and 4b and opens to the outer circumference thereof. The large piston 5 is provided with an axial fluid passage 5b which opens to the piercing fluid passage 4b of the small piston 4 located on the side of the larger diameter and with another fluid passage 5c which is in a diametric direction of the large piston and is arranged to have the axial fluid passage 5b communicate with an outer circumferential groove 5d of the large piston 5. The large piston 5 is further provided with a recess 5e which is formed at the right end thereof and is arranged to be in fitting engagement with a push rod which is not shown but is arranged to transmit an external force in response to a brake pedal which is also not shown.

The embodiment further includes a piston cup seal member 6 and seal members 7 and 8 which are arranged to tightly seal the sliding engagement faces of the large and small cylinders 2 and 3 and the large and small pistons 4 and 5. The backward movement of the large piston 5 is arranged to be stopped by a stopper ring 9 at a predetermined position.

There is provided a return piston 10 which is inserted and extends from the axial piercing fluid passages 4a and 4b of the small piston to the axial fluid passage 5b of the large piston 5. The right end of the return piston 10 slidably engages the axial fluid passage 5b of the large piston 5 while the left end thereof is formed to face the inside of the small cylinder 2 from the left end of the small piston 4. The return piston 10 is urged by a set spring 12 which exerts a spring force toward the left end of the piston 10 through a spring seat 11 to bias the return piston 10 toward the left end in such a manner that the spring 11 normally engages the stepped part of the piercing fluid passages 4a and 4b within the small piston 4.

At the open end of the piercing fluid passage 4a of the small piston 4, there is provided a ball 13 which, in combination with a valve seat 14, forms a check valve for restricting the return flow of fluid into the large cylinder 3. The ball 13 is pushed toward the valve seat 14 of the small piston 4 by a light-load check spring 16 which is provided with a spring case 15. However, the ball 13 engages the fore end of the return piston 10 and is thus normally kept away from the valve seat 14.

The small piston 4 is pushed in the direction of its rear end (or toward the large piston 5) through the spring case 15 by a return spring 17. A reference numeral 18 indicates an output fluid passage connecting the fluid chamber A of the small cylinder 2 to a brake device.

The cylinder body 1 is further provided with a stepped arrangement of relief valve cylinders 19, 20 and 21 which are formed in parallel to the above-mentioned stepped arrangement of cylinders 2 and 3. One end of the relief valve cylinder arrangement communicates with the output fluid passage 18. A fluid chamber D provided within a third cylinder 21 which is of the largest diameter communicates with a reservoir 22 and also communicates through an intake port 23 with a recessed groove 5d provided along the outer circumference of the large piston 5 within the large cylinder 3. Further, the fluid chamber normally communicates through a compensating port 24 with a fluid chamber B provided within the large cylinder 3. The compensating port 24 is arranged in such a position that a seal member 6 which is mounted on the large piston 5 comes to block the communication between the fluid chambers B and D when the large piston 5 begins to move to the left.

A numeral 25 indicates a relief piston. The left end of the relief piston 25 slidably engages a first cylinder 19 which is of the smallest diameter in the relief valve cylinder arrangement. The right end of the relief piston 25 is arranged to face the third cylinder 21 coming through the second cylinder 20 which is of intermediate diameter in the relief valve cylinder arrangement. With the right end of the relief piston 25 is engaged a ball 27 which, in combination with a valve seat 26 formed at the stepped part of the second and third cylinders 20 and 21, forms a relief valve for allowing the fluid within the fluid chamber C of the second cylinder 20 to escape to the fluid chamber D (or toward the reservoir).

Further included in the embodiment are a relief spring 28 which comes to cause the ball 27 to abut on a valve seat 26; and a fixed stop rod 29 which is arranged to have the rightward movement of the ball 27 against the spring force of the relief spring 28 stopped at a predetermined point. The fluid chamber C is arranged to always communicate with the fluid chamber B through a port 30.

The embodiment arranged as described above operates in the following manner: Under a non-braking condition, the spring force of each spring retains each corresponding piston in a stationary position as shown in FIG. 1. Accordingly, the fluid chamber B is communicating with the fluid chamber A via the check valve 13 and 14 and also with the fluid chamber D via the compensating port 24. Meanwhile, the fluid chamber B constantly communicates with the fluid chamber C as mentioned in the foregoing.

The fluid chambers A, B and C are thus all in a state of communicating with the reservoir 22 through the fluid chamber D. Against a minor degree of leakage of the brake fluid from the sealing arrangement, therefore, the brake system is receiving the replenishment of the fluid from the reservoir 22 from time to time as necessary. During brake application, a pedalling force exerted on a brake pedal adds an external force to the large piston 5 in the direction of arrow as shown in FIG. 1. This causes the piston 5 to move forward within the larger cylinder 3. Then, the small piston 4 also moves forward concurrently with the large piston 5. At the early stage of the brake application, a reaction force required for these forward movements is available from the spring force of the return spring 17. Further, since at this time there is no change in the axial force on the return piston 10 which controls the check valve 13 and 14, the return piston 10 remains unmoved relative to the large and small pistons 4 and 5 and the check valve 13 and 14 retains an open passage condition.

Following this, when the large piston 5 further moves, the piston cup 6 comes to block the communication between the fluid chambers A and B allowed by the compensating port 24. With the communication thus blocked, there takes place a rise in the fluid pressure in each of the fluid chambers A and B. Since the right end of the return piston 10 slidably engages in a liquid-tight manner with the axial fluid passage 5b of the large piston 5, the return piston 10 comes to have a fluid pressure exerted on the left side thereof in the axial direction according as the fluid pressure of the fluid chambers A and B increases. Accordingly, the return piston 10 is then moved rightward relative to the large and small pistons 5 and 4 while thus compressing a set spring 12. As a result of this, the ball 13 of the check valve comes to abut on the valve seat 14 and the communication between the fluid chambers A and B are blocked thereby.

When the large and small pistons 5 and 4 still further moved forward under this condition, the fluid chamber B comes to have a high degree of fluid pressure as determined by the ratio of the effective pressure receiving area of the fluid chamber B to that of the fluid chamber A. This causes the ball 13 of the check valve to repeat abutting and detaching on and from the valve seat 14 and thus to equalize the fluid pressure difference between the fluid chambers A and B by supplying the fluid from the chamber B to the chamber A.

Therefore, at the initial stage of brake application at which the check valve 13 and 14 is still open, a large quantity of fluid corresponding to the voluminal decrease which takes place within the large and small cylinders 2 and 3 according as the large and small pistons 5 and 4 move forward is transferred through the output fluid passage 18 to the brake device. Accordingly, a relatively short stroke of the brake pedal can cause the friction pads of the brake device (a disc brake)

to abut on the rotor by coming across the gap between the rotor and each of them.

When the friction pads abut on the rotor and are pressed against it, a resultant reaction force causes high fluid pressure to develop within the fluid chambers A and B. Then, if, in this instance, the above described actions of the large and small pistons 5 and 4 involving the check valve 13 and 14 and the fluid pressure relation of the fluid chambers A and B should continue unchanged, an extremely great operating reaction force would be exerted on the brake pedal through the large piston 5. Whereas, in accordance with the present invention, this problem is solved by the provision of the relief valve 20 and 26, which serves to nullify the fluid pressure within the fluid chamber B in the following manner:

When the high fluid pressure develops within the fluid chamber B, the fluid pressure is transmitted to the fluid chamber C which is communicating with the chamber B. Then, the transmitted fluid pressure moves the ball 27 away from the valve seat 26 against the force of the spring 28 and thus escapes to the fluid chamber D, i.e. toward the reservoir. This lowers the fluid pressure in the fluid chambers B and C. Then, with the fluid pressure of the chambers B and C lowered, the relief piston 25 is caused to move rightward by the action of fluid pressure exerted from the output fluid passage 18 and comes to a stop by pressing the ball 27 against the stop rod 29. By this, the fluid chambers B and C are always rendered communicative with the reservoir 22. In other words, the operating reaction force on the brake pedal derives solely from the fluid pressure within the small cylinder 2, so that a sufficiently high degree of braking fluid pressure can be obtained with the pedalling force of the brake pedal effectively multiplied. (At this time, transfer of fluid in large quantity is no longer required, because the friction pads have already come to abut on the rotor.)

At the time of brake release, since the large piston 5 then has no external force added thereto any longer, the large and small pistons 5 and 4 move back to their initial positions to increase the inside volume of the fluid chamber A. The increased inside volume of the fluid chamber A causes the check valve 13 and 14 to open to completely release the fluid pressure.

With the embodiment arranged in this manner, the transfer of fluid in large quantity required for covering the gap between the rotor and the friction pads can be efficiently accomplished by the movement of the larger piston within the larger cylinder. Meanwhile, the great thrusting force required after abutting of the friction pads on the rotor can be obtained in a great multiplying ratio to a pedalling force on the brake pedal by virtue of the movement of the smaller piston within the smaller cylinder. Besides, in case of sudden brake application, the fluid pressure of the fluid chamber B can be released without fail when a rise of fluid pressure takes place to a predetermined value in the output fluid passage after fluid pressure within the fluid chamber B is transmitted to the fluid chamber A, so that a reliable operating condition still obtains even in such a case.

Example 2

Figure 2:
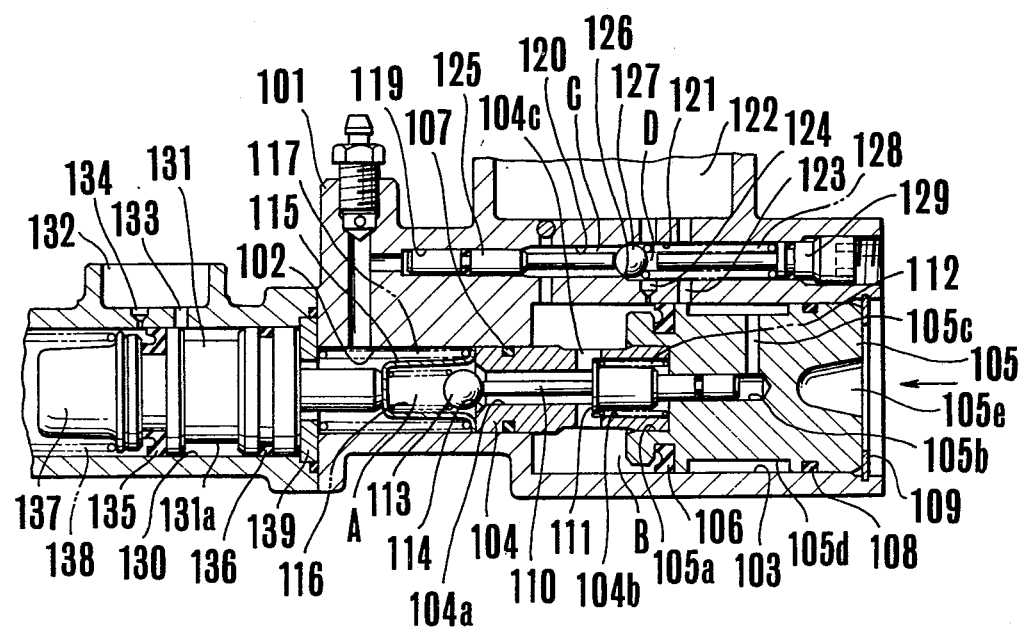
FIG. 2 is a longitudinal sectional view showing a fluid pressure cylinder arrangement including a differential master cylinder as a second embodiment example of the invention.

A second embodiment example of the invention is as shown in FIG. 2. While the first embodiment is arranged to have the fluid pressure of the fluid chamber B transmitted as it is to the brake device, the second embodiment is provided with an additional fluid pressure cylinder arrangement which is disposed continuously from and concentrically with the fluid chamber B on the left side thereof. The arrangement is such that, under a reposed condition, the right end of a fluid pressure generating piston of the fluid pressure cylinder arrangement is nearly abutting on the spring case of the check valve. In other words, in the case of the second embodiment, the differential master cylinder of the first embodiment is modified to serve as external force transmitting and multiplying means for the fluid pressure cylinder arrangement. Accordingly, the differential master cylinder of the second embodiment shown in FIG. 2 has the same structural arrangement as that of the first one shown in FIG. 1. In FIG. 2, the parts which are the same as those shown in FIG. 1 are indicated with 100 added to the reference numerals used in FIG. 1 and the description of them is omitted herein.

The fluid pressure cylinder arrangement which is arranged coaxially with the stepped arrangement of cylinders 102 and 103 comprises a cylinder 130; a fluid pressure generating piston 131; a recessed groove 131a formed along the outer circumference of the piston 131; a reservoir 132; an intake port 133; a compensating port 134; a piston cup 135; a seal member 136; a spring seat 137; a return spring 138; and a stop ring 139. A fluid chamber formed at the left end of the fluid pressure generating piston 131 is arranged to communicate with the brake device. The second embodiment which is provided with the fluid pressure cylinder arrangement of the construction described above is normally arranged to ensure a long stroke of the initial movement of the fluid pressure generating piston and to reduce the operating reaction force in response to the replenishment of the fluid chamber A with a large quantity of fluid from the fluid chamber B at the initial stage of a braking operation and the generation of high fluid pressure which takes place within the fluid chamber A after the friction pads abut on the rotor. These functions are effectively carried out by the provision of the large piston 105, which has a larger diameter than the fluid pressure generating piston 131 shown in the drawing, and the small piston 104 in the same manner as in the first embodiment example. In addition to these functions, the second embodiment has an advantageous feature that: Even if the fluid chambers A and B of the differential master cylinder should fail to have fluid pressure as required, an additional external force can be transmitted directly to the fluid pressure generating piston 131 via the spring case 115 to ensure a braking operation to a certain extent even under such a condition.

As described in the foregoing, the differential master cylinder according to the present invention not only gives a good force multiplying effect despite of the relatively simple construction thereof but also ensures a stable operation even in cases of sudden brake application. The invention, therefore, has great advantages for practical applications.

What is claimed is:

1. A differential master cylinder for a brake system comprising:
    a cylinder body;
    a stepped cylinder provided in the cylinder body;
    a stepped piston slidable within the stepped cylinder;
    a first chamber defined by the end of a smaller diameter portion of said stepped piston and a smaller diameter portion of said stepped cylinder;

a second chamber defined by the stepped piston and a larger diameter portion of the stepped cylinder;

a first fluid passage provided at the stepped piston and arranged to have the first chamber and the second chamber communicate with each other;

a check valve arranged in the first fluid passage to close when fluid pressure within the second chamber reaches a first setting value; and a relief valve arranged to open to return fluid from the second chamber to a reservoir when the fluid pressure within the second chamber reaches a second setting value which is higher than the first value, said relief valve being disposed in a second fluid passage which is formed within said cylinder body to render the second chamber communicative with the reservoir, said relief valve comprising a first valve seat disposed in the second fluid passage and a first valve body having one end thereof facing the second chamber and the other end thereof facing the reservoir, said first valve body being engaged with the first valve seat, and said relief valve being provided with a first spring arranged to act on the first valve body in opposition to a force exerted on the first valve body by the fluid pressure of said second chamber;

wherein said check valve comprises a second valve seat formed at the end of said first fluid passage facing said first chamber; a return piston which is arranged to slide within the larger diameter portion of said stepped piston and has one end thereof facing said second chamber and the other end thereof facing said reservoir; a second valve body biased to engage the second valve seat; and a second spring which urges the return piston to move the second valve body away from the second valve seat by causing the return piston to abut on the second valve body.

2. A differential master cylinder according to claim 1, wherein said cylinder body is provided with first, second and third cylinders which are interconnected and are arranged to be nearly in parallel with said stepped cylinder; said first cylinder is arranged to communicate with said first chamber, said second cylinder to communicate with said second chamber and said third cylinder to communicate with said reservoir; and said first valve seat is disposed at a stepped part situated between the second cylinder and the third cylinder.

3. A differential master cylinder according to claim 2, wherein a relief piston is slidably arranged at said first cylinder; and one end of the relief piston is arranged to face said first chamber and the other end to engage said first valve body.

4. A differential master cylinder according to claim 3, wherein there is provided a stop rod which is secured to said cylinder body and is arranged to restrict to a predetermined extent the movement of said first valve body away from said first valve seat.

5. A differential master cylinder according to claim 1, wherein said first chamber is connected to a brake device.

6. A differential master cylinder according to claim 1, further including a fourth cylinder arranged coaxially with said stepped cylinder; and a fluid pressure generating piston arranged to be slidable in the fourth cylinder in fitting engagement therewith, one end of the piston being in an abutting relation to said stepped piston via an intermediate member and the other end of the piston facing a third chamber connected to a brake device.

* * * * *